US012609423B2

(12) United States Patent
Fritz et al.

(10) Patent No.: US 12,609,423 B2
(45) Date of Patent: Apr. 21, 2026

(54) RELAY CONTROL SYSTEM AND BATTERY SYSTEM

(71) Applicant: SAMSUNG SDI CO., LTD., Yongin-si (KR)

(72) Inventors: Jürgen Fritz, Graz (AT); Thomas Trathnigg, Graz (AT); Damir Kovac, Graz (AT); Christoph Schmiedhofer, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 702 days.

(21) Appl. No.: 17/869,612

(22) Filed: Jul. 20, 2022

(65) Prior Publication Data

US 2023/0027996 A1    Jan. 26, 2023

(30) Foreign Application Priority Data

Jul. 26, 2021    (EP) ..................................... 21187761
Jul. 15, 2022    (KR) ........................ 10-2022-0087810

(51) Int. Cl.
    *B60L 58/18*        (2019.01)
    *H01M 10/42*        (2006.01)
    *H01M 50/583*       (2021.01)

(52) U.S. Cl.
    CPC ........... *H01M 50/583* (2021.01); *B60L 58/18* (2019.02); *H01M 10/425* (2013.01); *H01M 2010/4271* (2013.01); *H01M 2220/20* (2013.01)

(58) Field of Classification Search
    CPC ........ H01H 9/56; H01H 47/22; H01H 47/002; H01H 47/02; H01H 50/002; H01H 9/563;
    (Continued)

(56) References Cited

U.S. PATENT DOCUMENTS 8,823,206 B2 *  9/2014  Omoto ................. B60L 3/0046
                                                      307/9.1
2009/0039703 A1    2/2009  Soma et al.
(Continued)

FOREIGN PATENT DOCUMENTS

| CN | 202134465 U | * | 2/2012 |
|----|----|----|----|
| JP | 2011-088598 A | | 5/2011 |
| WO | WO 2014/125685 A1 | | 8/2014 |

OTHER PUBLICATIONS

European Search Report issued in EP Application No. 21187761.8, dated Jan. 27, 2022, 7 pages.
(Continued)

*Primary Examiner* — Elim Ortiz
(74) *Attorney, Agent, or Firm* — Womble Bond Dickinson (US) LLP

(57)    ABSTRACT

A relay control system for a battery system is provided. The relay control system includes: an electrical interface configured to detachably receive a connector; a power supply electrically connected in parallel to a coil of a relay through power supply lines; a relay driver switch interconnected between the power supply and the coil in one of the power supply lines; and a controller electrically connected in parallel to the relay driver switch through relay driver control lines to control the relay driver switch. One of the power supply lines or the relay driver control lines is routed across the interface, and the relay control system is configured to open the relay when the one of the power supply lines or the relay driver control lines is interrupted in response to the connector being detached from the interface.

11 Claims, 2 Drawing Sheets

(58) Field of Classification Search
CPC .......... H01H 50/54; B60R 16/03; H02P 1/10;
G01R 31/3274
USPC ........... 307/9.1, 10.1, 10.6, 115, 18, 23, 30;
361/62; 106/31.92; 252/62.54
See application file for complete search history.

(56) References Cited

U.S. PATENT DOCUMENTS

| | | | |
|---|---|---|---|
| 2011/0261498 A1 | 10/2011 | Ikeda et al. | |
| 2016/0042900 A1 | 2/2016 | Ozaki et al. | |
| 2018/0072179 A1* | 3/2018 | Burkman | B60L 53/14 |
| 2020/0052508 A1 | 2/2020 | Thayer et al. | |
| 2020/0052509 A1* | 2/2020 | Fan | H01R 31/08 |

OTHER PUBLICATIONS

European Notification of the Office Action for Patent Application No. 21187761.8, dated Aug. 20, 2024, 4 pages.
Chinese Office Action dated Mar. 21, 2025, issued in corresponding Chinese Patent Application No. 202210850299.4, 6 pages.

* cited by examiner

RELAY CONTROL SYSTEM AND BATTERY SYSTEM

CROSS-REFERENCE TO RELATED APPLICATION

The application claims priority to and the benefit of European patent application number 21187761.8, filed on Jul. 26, 2021, in the European Patent Office, and Korean patent application number 10-2022-0087810, filed on Jul. 15, 2022, in the Korean Patent Office, the entire disclosures of all of which are incorporated herein by reference.

1. Field

Aspects of embodiments of the present disclosure relate to a relay control system and a battery system including the same.

2. Description of the Related Art

Recently, vehicles for transportation of goods and peoples have been developed that use electric power as a source for motion. Such an electric vehicle is an automobile that is propelled by an electric motor using energy stored in rechargeable (or secondary) batteries. An electric vehicle may be solely powered by batteries or may be a hybrid vehicle powered by, for example, a gasoline generator. Furthermore, the vehicle may include a combination of an electric motor and a conventional combustion engine.

Generally, an electric-vehicle battery (EVB, or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter provides an irreversible conversion of chemical to electrical energy. Low-capacity rechargeable batteries are used as power supply for small electronic devices, such as cellular phones, notebook computers, and camcorders, while high-capacity rechargeable batteries are used as power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, may be selected based on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled to each other in series and/or in parallel to provide a high energy density, such as for motor driving of a hybrid vehicle. For example, the battery module may be formed by interconnecting the electrode terminals of the plurality of unit battery cells in an arrangement or configuration depending on a desired amount of power and to realize a high-power rechargeable battery.

Battery modules can be constructed in either a block design or a modular design. In the block design, each battery is coupled to a common current collector structure and a common battery management system, and the unit thereof is arranged in a housing. In the modular design, pluralities of battery cells are connected to form submodules, and several submodules are connected to form the battery module. In automotive applications, battery systems often consist of a plurality of battery modules connected to each other in series to provide a desired voltage. The battery modules may include submodules with a plurality of stacked battery cells, and each stack may include cells connected in parallel that are, in turn, connected in series (XpYs) or cells connected in series that are, in turn, connected in parallel (XsYp).

A battery pack is a set of any number of (often identical) battery modules. They may be configured in a series, parallel or a mixture of both to deliver the desired voltage, capacity, or power density. Battery packs include the individual battery modules and the interconnects, which provide electrical conductivity between them. Static control of battery power output and charging may not be sufficient to meet the dynamic power demands of various electrical consumers connected to the battery system. Thus, steady exchange of information between the battery system and the controllers of the electrical consumers may be employed. This information may include the battery system's actual state of charge (SoC), potential electrical performance, charging ability, and internal resistance as well as actual or predicted power demands or surpluses of the consumers.

Therefore, battery systems may include a battery management system (BMS) for obtaining and processing such information on a system level and may further include a plurality of battery module managers (BMMs), which are part of the system's battery modules, for obtaining and processing relevant information on a module level. The BMS usually measures the system voltage, the system current, the local temperature at different places inside the system housing, and the insulation resistance between live components and the system housing. The BMMs usually measure the individual cell voltages and temperatures of the battery cells in a battery module.

The BMS/BMU is provided to manage the battery pack, such as by protecting the battery from operating outside its safe operating area (or safe operating parameters), monitoring its state, calculating secondary data, reporting that data, controlling its environment, authenticating it, and/or balancing it.

In case of (e.g., in the event of) an abnormal operation state, the battery pack should be disconnected from a load connected to a terminal of the battery pack. The battery systems may include a battery disconnect unit (BDU) that is electrically connected between the battery module and battery system terminal(s). The BDU, when present, is the primary interface between the battery pack and the electrical system of the vehicle, for example. The BDU includes electromechanical switches that open or close high current paths between the battery pack and the electrical system. The BDU provides feedback to the battery control unit (BCU) accompanied to the battery modules, such as voltage and current measurements. The BCU controls the switches in the BDU using low current paths based on the feedback received from the BDU. The BDU may, thus, control current flow between the battery pack and the electrical system and may perform current sensing. The BDU may also manage external charging and pre-charging.

In battery systems, the main contactors (e.g., a relay) may need to be opened in case a defined internal loop is interrupted. Conventionally, a so-called hazardous voltage interlock loop (HVIL), which is a closed loop through high voltage components of the vehicle, is implemented. When this loop is interrupted, hazardous voltages have to be removed (or ceased) to prevent the risk of high voltage accidents, for example, during service. For example, the relay needs to open to disconnect the battery voltage in response to a detected interruption of the loop, for example, for a service case.

Such interruption of the HVIL loop may be the result of removing a connector from an interface. In a relay control system, typically a power supply may be electrically connected with a coil of a relay, and a relay driver switch may be interconnected between the power supply and the coil. The relay driver switch may be controlled by a controller. A HVIL loop may be fed across an interface, and the loop may be mechanically interrupted to be separated when the connector is separated and removed.

Additional components for detection and diagnosis may be provided, which may detect and/or diagnose a local interrupt of the HVIL loop. This information may be transmitted to a controller, which may control the driver switch to open the relay.

Sometimes, batteries may be designed such that internal battery components (e.g., battery internal components) include a HVIL. For example, battery internal components typically using a HVIL may be a manual service disconnect fuse (MSD fuse), a separate service box, or a battery disconnect unit (BDU), or battery junction box (BJB) that is externally attached to the battery pack.

However, not all HVILs have the same detection requirements and reaction times. Therefore, in some cases, more than two independent HVIL loops may be employed.

The inclusion of one or more additional internal HVIL in battery systems and battery packs presents further disadvantages. Such integration requires additional hardware and software functions, for example, a HVIL source, a HVIL detector, and a diagnosis circuit to detect an interruption of the HVIL.

If the HVIL is additionally a part of a safety function, an automotive safety integrity level (ASIL), rating and the FIT rates (failure rate in time) of these components and several other safety relevant parameters have to be additionally considered.

SUMMARY

According to embodiments of the present disclosure a relay control system and a battery system including the same are provided that do not need an additional HVIL to open the relay when an interrupt at a critical interface has occurred. Additionally, safety of the battery system may be increased while the amount of hardware involved is reduced.

Embodiments of the present disclosure seek to solve at least one of the problems existing in the prior art to at least some extent. In one embodiment, a relay control system for a battery system is provided including an electrical interface to which a connector is detachably connectable. The relay control system further includes a power supply electrically connected in parallel to a coil of a relay through power supply lines. Further, a relay driver switch is interconnected between the power supply and the coil in one of the power supply lines. Further, a controller is electrically connected in parallel to the relay driver switch by relay driver control lines to control the relay driver switch. One from among the power supply lines or the relay driver control lines is routed, in an electrically conductive manner, across the interface when the connector is connected to the interface, and electrically is interrupted across the interface when the connector is detached from the interface. The relay control system is configured to open the relay when the one from among the power supply lines or the relay driver control lines is interrupted in response to the connector being detached from the interface.

The connector may be a service connector or a service plug. An electrical interface may be an interface which allows for an electrical current to flow through the connector when attached thereto. The electrical interface may also be an interface or a connection terminal. The term "electrically interrupted" as used herein may mean, in other words, electrically disconnected or non-conductive, that is, that no current or no control signal is or can be transmitted across the interface. The power supply may be an internal supply (e.g., an applied voltage). The power supply may be a DC voltage. However, the power supply may also be an AC voltage (e.g., an AC current may flow through the coil). The voltage of the power supply may be higher than the voltage of the control signals of the controller. For example, the controller may have an output voltage of about 5 V, and the power supply may have a higher (or substantially higher) output voltage. The detachable connector may have a conductive portion that may form a conductive section (e.g., an electric continuation) of the routed line across the interface in the connected state. The controller may be a microcontroller. The term "routed" as used herein means that the one line from among the power supply lines or the relay driver control lines is diverted/lead to the interface and, via the interface, to one of the relay driver switch in the case of the relay driver control line, or the coil in the case of the power supply line. The length of a route to the interface may be about 0.5 m, about 0.75 m, or even about 1 m, but the present disclosure is not restricted thereto.

The present disclosure has the advantage that internal control lines, which are needed to control the relay, may replace the HVIL entirely such that a HVIL may be omitted, allowing for opening the relay in the case of a detachment of the connector at the interface. For example, the additional hardware units needed in HVIL solutions, for example, to detect and diagnose an interrupt at the interface, may be omitted. No additional control lines are needed in addition to the control lines which have to be used also in the conventional examples. Thus, hardware and software is substantially reduced. When routing one of the power supply lines or the relay driver control lines across the interface, detaching of the connector is directly diagnosable/recognizable through these internal control lines. Thus, detachment is sensed by the line routed across the interface. Because these internal control lines are used to control the relay, due to the routing of these internal control lines across the interface, the interruption itself of one of these control lines can be used to control the relay to open. This is also safe because no additional failure rates (or points of failure) need to be considered. Further, the reaction time is fast as there is no additional hardware and software units involved. Thus, hazardous voltages are rapidly prevented and safety is increased.

One of the relay driver control lines may be routed across the interface, and in such an embodiment, the relay driver switch is configured to open the relay when the relay driver control line is interrupted in response to the connector being detached from the interface. Using the relay driver control line for the driver switch results in lower currents being led through the interface and, therefore, control of the relay can be performed based on lower voltages. This results in lower risk of electrical arcs, damage, and current peaks at the interface in the process of detachment of the connector. For example, the electromechanical compatibility is improved by this solution due to the reduced currents and voltages involved. For example, this embodiment can be used when reduced interferences are desired, including when the power supply is an AC power source.

One of the relay driver control lines may be routed across the interface, and in such an embodiment, the relay driver switch is configured to open the relay when a control signal of the controller is interrupted in response to the connector being detached from the interface. The interruption of a control signal is a direct consequence of the detachment of the connector. Therefore, the interruption of a control signal is directly indicative of the detachment of the connector.

The control signal may be a logic high level, and the relay driver switch may be configured to open the relay when the logic high level is interrupted in response to the connector being detached from the interface. A logic high level may be, for example, a 5 V signal, but the present disclosure is not restricted thereto. Thus, when a logic high value (e.g., '1') is applied to the relay driver switch in the default case of the connector being connected or attached to the interface. In response to the detachment of the connector (e.g., the relay driver control line interruption), the logic high value due to the line interruption may not be applied to the relay driver switch. Thus, the logic high value being interrupted is directly indicative of the detachment of the connector such that the relay control switch open. Then, the power supply is disconnected from the coil of the relay, and the relay may open.

The control signal may be an electrical current, and the relay driver switch may be configured to open the relay when the electrical current is interrupted in response to the connector being detached from the interface. When the relay driver control line is interrupted due to the detachment, the electrical current is also directly interrupted and is, thus, indicative of the detachment. For example, the electrical current immediately drops to zero in response to the detachment of the connector. Based on this drop, the relay driver switch may be configured to open and, thus, disconnect the power source from the coil to open the relay.

The power supply may be an AC power supply. In such an embodiment, energy is saved. When the relay control lines are routed across the interface, the electromagnetic compatibility is high. Also, DC power supply may be used. For example, a DC supply may be suitable in an embodiment in which the power supply lines are routed across the interface.

One of the power supply lines may be routed across the interface, and the relay is configured to open when the power supply line is interrupted in response to the connector being detached from the interface. In such an embodiment, the current through the coil is directly interrupted when the power supply line is interrupted in response to the connector being detached. Accordingly, the reaction time is fast because the interruption of the power supply line directly prevents an electric current to flow through the coil of the relay.

The one of the power supply lines may be routed across the interface between the relay driver switch and the coil. This leads to reduced reaction times.

The relay driver switch may be a high side driver switch. Thus, the relay driver switch switches the first voltage terminal of the power supply, and the coil of the relay is directly connected to the second voltage terminal of the power source. Also, the relay driver switch may be a low side driver switch.

The controller may be configured to close the relay when the one from among the power supply line and the relay driver control line is electrically conductive in response to the connector being connected to the interface.

A further embodiment of the present disclosure provides a battery system including a relay control system according to one of the above-described embodiments. The battery system may include a plurality of battery cells electrically connected between a first output terminal and second output terminal. The output power lines may be respectively connected to the first terminal and the second output terminal, and the relay is integrated in at least one of the power lines.

Another embodiment of the present disclosure provides a vehicle, in particular an electrical vehicle, including the battery system as disclosed above.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1:
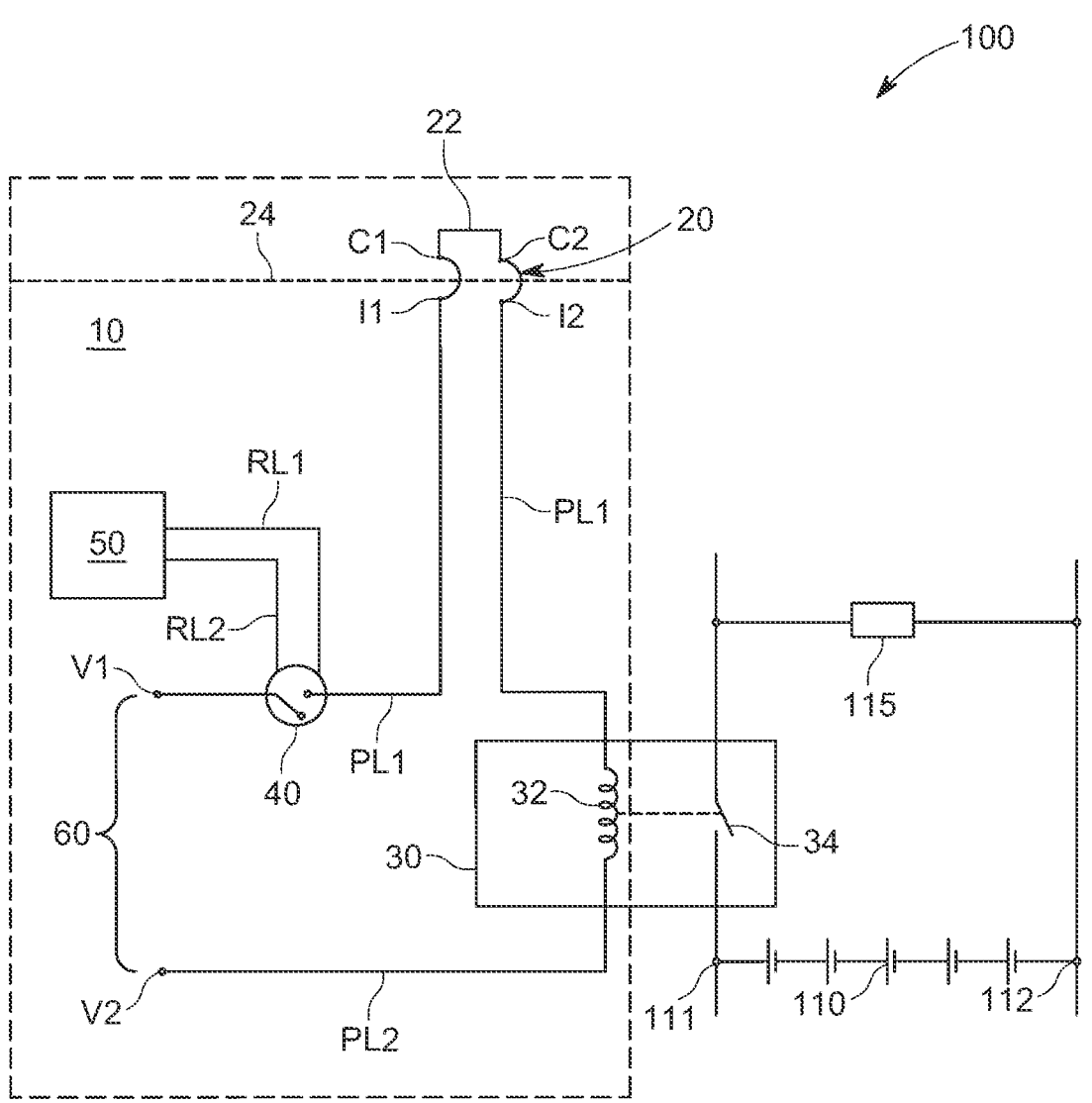
FIG. 1 is a schematic representation of a relay control system and a battery system according to a first embodiment.

Reference will now be made in detail to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions may be omitted. The present disclosure, however, may be embodied in various different forms and should not be construed as being limited to the embodiments illustrated herein. Rather, these embodiments are provided as examples so that this disclosure will be thorough and complete, and will fully convey the aspects and features of the present disclosure to those skilled in the art.

Accordingly, processes, elements, and techniques that are not considered necessary to those having ordinary skill in the art for a complete understanding of the aspects and features of the present disclosure may not be described. In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items. Expressions such as "at least one of," when preceding a list of elements, modify the entire list of elements and do not modify the individual elements of the list.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallizations and/or pins, and/or may comprise conductive polymers or ceramics. Further electrical energy might be transmitted via wireless connections, e.g. using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic illustration of a relay control system 10 and a battery system 100 according to a first embodiment of the present disclosure.

The relay control system 10 includes an electrical interface 20. The interface 20 may be formed in a support panel 24 and/or in a support frame of the relay control system 10 of the battery system 100. The support panel 24 may be part of a housing. A connector 22, for example, a service connector, is detachably connected to the interface 20. The interface 20 may include a first interface terminal I1 and a second interface terminal I2. The connector 22 may include a first connector terminal C1 and a second connector terminal C2, which are respectively connected to the corresponding interface terminals I1, I2. The connector 22 and/or the interface 20 may include mechanical fixation elements, which allow for a releasable mechanical coupling by, for example, a user for service or maintenance.

For example, the connector 22 can repeatedly detached from and (re)attached to the interface 20. The connector 22 may be a service plug or a service connector, which is removed from the interface 20 for when service is to be performed. The connector 22 may have a conductive section which, when the connector 22 is connected to the interface 20, electrically connects the interface terminals I1, I2 through the conductive section of the connector 22.

The relay control system 10 further includes a power supply 60, which may be an integrated power supply. The power supply 60 may include a first voltage terminal V1 and a second voltage terminal V2. In the illustrated embodiment, the power supply may be a DC power supply, but in other embodiments, the power supply may be an AC power supply. When the power supply 60 is a DC power supply, the first voltage terminal V1 may be a plus (or positive) pole and the second voltage terminal V2 may be a minus (or negative) pole, for example. The power supply 60 may provide a current of, for example, about 1 A and a voltage of, for example, more than about 5 V, but the present disclosure is not limited thereto. The power supply 60 is electrically connected in parallel with a coil 32 of a relay 30. The power supply 60 provides a current to flow through the coil 32. For example, when the relay 30 is in a closed (or conductive) state, the current provided by the power supply may flow through the coil 32. The power supply 60 may be electrically connected to the coil 32 by power supply lines PL1; PL2. The first power supply line PL1 may interconnect the first voltage terminal V1 with the coil 32. The second power supply line PL2 may interconnect the second voltage terminal V2 with the coil 32.

The relay control system 10 further includes a relay driver switch 40. The relay driver switch 40 is interconnected between the power supply 60 and the coil 32 in one of the power supply lines PL1, PL2. In the illustrated embodiment, the relay driver switch 40 is integrated in the first power supply line PL1. Thus, the relay driver switch 40 in this example is a high side driver switch while the coil 32 is directly connected to the second voltage terminal V2. However, the relay driver switch may, in other embodiments, be a low side driver switch.

Further, the relay control system 10 may include a controller 50 (e.g., a microcontroller). The controller 50 is connected in parallel to the relay driver switch 40 through relay driver control lines RL1; RL2. The controller 50 controls the relay driver switch 40. A first relay driver control line RL1 may interconnect a first voltage output terminal of the controller 50 with the relay driver switch 40, while the second relay driver control line RL2 may interconnect a second voltage output terminal with the relay driver switch 40.

In the illustrated example, the first power supply line PL1 from among the power supply lines PL1; PL2 is routed across the interface 20, but the present disclosure is not restricted thereto. For example, a first part of the first power supply line PL1 is electrically connected to the interface terminal I1, and a second part of the first power supply line PL2 extends from the interface terminal I2 to the coil 32 of the relay 30. Thus, the first power supply line PL1 is lead through the interface 20 or routed across the interface 20. The first power supply line PL1 may be routed across the interface 20 between the relay driver switch 40 and the coil 32. The interface 20 may be positioned between the relay driver switch 40 and the coil 32 of the relay 30.

The power supply line PL1 is electrically conductive across the interface 20 when the connector 22 is connected to the interface 20. The conductive section of the connector 22 forms an electric continuation across the interface 20. Thus, when the connector 22 is connected to the interface 20, the first power supply line PL1 is non-interrupted (or is conductive) across the interface 20. Otherwise, when the connector 22 is detached or removed from the interface 20, the power supply line PL1 is electrically interrupted (or is non-conductive) across the interface 20. The removal may be a mechanical removal by a user, for example, for service purposes.

In response to the detachment (or removal) of the connector 22, the relay control system 10 is configured to open the relay 30 when the first power supply line PL1 is interrupted. In the illustrated example, when the power supply line PL1 is interrupted in response to the connector 22 being detached from the interface 20, the relay 30 is configured to open. In this case, because the power supply line PL1 is interrupted, the current flow through the coil 32 is interrupted (or blocked). Thus, in response (e.g., in direct response) to the detachment of the connector 22, the relay 30 is opened because the current through the coil 32 is blocked due to the interruption of the power supply line PL1 across the interface 20.

The illustrated embodiment provides for intrinsic opening of the relay 30 by using the power supply lines PL1; PL2 such that the interruption of the power line PL1 can directly lead to an opening of the relay 30. For example, the power supply lines PL1, PL2 directly sense the interrupt and open the relay 30. Therefore, the reaction time is particularly fast, and no additional hardware is needed. Only the power supply line PL1 need to be routed across the interface 20 such that the connector 22, when removed, interrupts the power supply line PL1.

Further, a battery system 100 including the relay control system 10 is described. For example, the battery system 100 may include a plurality of battery cells 110 electrically connected between a first output terminal 111 and second output terminal 112. The first output terminal 111 may refer to the high output voltage. Further, output power lines may be respectively connected to the first output terminal 111 and the second output terminal 112. In the illustrated example, the relay 30, 34 is integrated in the power line connected to the high output voltage (e.g., the first output terminal 111). Further, a load 115 may be electrically connected in parallel to the plurality of battery cells 110.

Therefore, when the relay 30, 34 is opened in response to the connector 22 being detached from the interface 20, the battery becomes disconnected through the opening of the relay 30, 34. For example, in response to the opening of the relay 30, a load 115 becomes disconnected from the battery voltage and, thus, hazardous voltages are removed.

Figure 2:
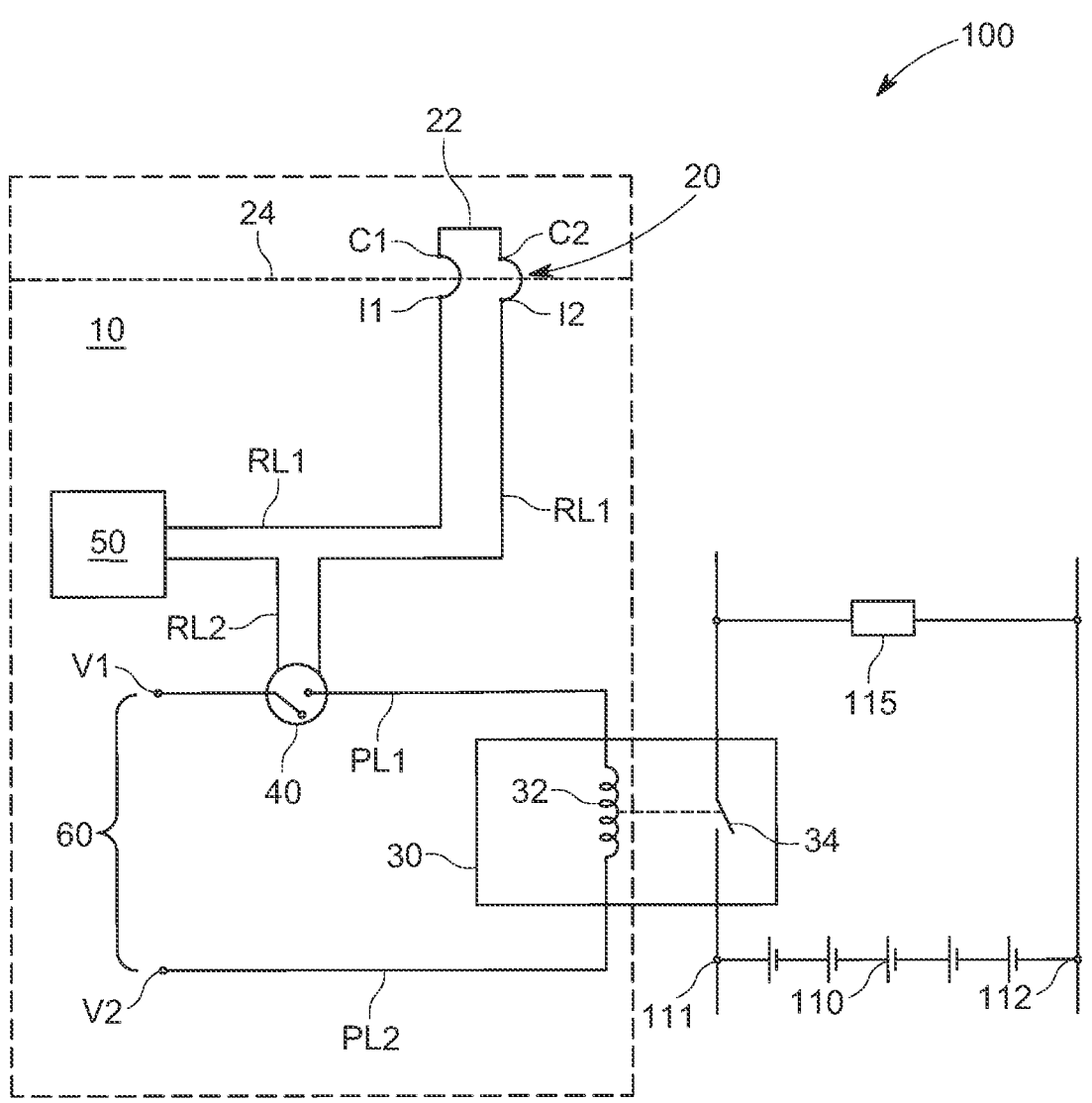
FIG. 2 is a schematic representation of a relay control system and a battery system according to a second embodiment.

FIG. 2 is a schematic illustration of a relay control system 10 and a battery system 100 according to a second embodiment of the present disclosure. Redundant descriptions with respect to FIG. 1 may be omitted for the sake of conciseness. Details described as having the same features as in FIG. 1 above apply to the embodiment described below and may be omitted for the purpose of conciseness.

The relay control system 10 for a battery system 100 according to the illustrated embodiment includes an electrical interface 20 to which a connector 22 is detachably connected. The power supply 60 is electrically connected in parallel to a coil 32 of a relay 30 via power supply lines PL1, PL2. The relay driver switch 40 is interconnected between the power supply 60 and the coil 32 in one of the power supply lines PL1, PL2. The controller 50 (e.g., the microcontroller) is electrically connected in parallel to the relay driver switch 40 by relay driver control lines RL1; RL2 to control the relay driver switch 40. The relay driver switch may be a high side driver switch.

In the illustrated embodiment, different from the embodiment shown in FIG. 1, one of the relay driver control lines from among the relay driver control lines RL1; RL2 is routed across the interface 20. In one embodiment, the first relay driver control line RL1 is routed across the interface 20. In other embodiments, the second relay driver control line RL2 may be routed across the interface 20. For example, the first relay driver control line RL1 is routed across the interface 20 and may interconnect a first output terminal of the controller 50 with the relay driver switch 40. The second relay driver control line RL2 may be directly connected to the relay driver switch 40.

The interface 20 is configured in the same manner as in FIG. 1. For example, the first relay driver control line RL1 is electrically conductive across the interface 20 when the connector 22 is connected to the interface 20. Further, the relay driver control line RL1 is electrically interrupted at the interface 20 when the connector 22 is detached from the interface 20. For example, a first part of the first relay driver control line RL1 is electrically connected to the first interface terminal I1, and a second part of the first relay driver control line RL2 extends from the second interface terminal I2 to the relay driver switch 40. The conductive section of the connector 22 forms an electric continuation across the interface 20 for the first relay driver control line RL1. Thus, when the connector 22 is connected to the interface 20, the first relay driver control line RL1 is non-interrupted. Otherwise, when the connector 22 is detached (or removed) from the interface 20, the first relay driver control line RL1 is electrically interrupted (i.e., is non-conductive) across the interface 20.

Also, in this embodiment, the relay control system 10 is configured to open the relay 30 when the relay driver control lines RL1 is interrupted and in response to the connector 22 being detached from the interface 20.

In the illustrated embodiment, the relay driver switch 40 is configured to open the relay 30 when the relay driver control line RL1 is interrupted in response to the connector 22 being detached from the interface 20. Therefore, the relay 30 is not directly opened, as compared to the embodiment shown in FIG. 1, but is opened via the relay driver switch 40. For example, when the relay driver switch 40 is opened in response to the connector 22 being detached as described above, the first power line PL1 is interrupted (or disconnected) from the power supply 60 such that the current flow through the coil 32 is interrupted (or blocked). As a result, the relay 30 may open. Thus, the relay 30 can be opened by using the relay driver control lines RL1; RL2 to sense the interruption due to the detachment of the connector 22. Because only relatively small voltages, for example, about 3.3 V or about 5V, and currents are present in the relay driver control circuit, the use of control lines provides improved electromagnetic compatibility and, thus, can be used in environments where low interference is needed. Also, electric arcs at the interface 20 may be prevented when the relay control lines RL1, RL2 are used. For example, the power supply 60 may be configured as an AC power source to save energy but still have high electromagnetic compatibility. However, a DC power source may be used.

The opening of the relay driver switch 40 can be performed by one or more of the following examples. The relay driver switch 40 may be configured to open the relay 30 when a control signal of the controller 50 is interrupted in response to the connector 22 being detached from the interface 20. For example, the relay driver switch 40 may receive a control signal (e.g., a permanent or constant control signal) in the closed state, which may be the default state. When this control signal is interrupted, this interruption is indicative of the connector 22 being detached from the interface 20. Thus, the interruption of the control signal may initiate the opening of the relay driver switch 40.

In an example, the control signal may be a logic high level (e.g., a logic '1', for example, 3.3 V or 5V). The interruption of the relay driver control line RL1 interrupts the control signal such that the logic high level is interrupted (e.g., is not received by or not applied to the relay driver switch 40). Also, the control signal may be an electrical current and the relay driver switch 40 is configured to open the relay 30 when the electrical current is interrupted (e.g., blocked) in response to the connector 22 being detached from the interface 20. The interruption of the electric current may, thus, trigger the relay driver switch 40 to open the relay 30 by disconnecting the coil 32 from the power supply 60.

Also, in the illustrated embodiment, a battery system 100 may be provided which includes the relay control system 10. For example, the battery system 100 may include a plurality of battery cells 110 electrically connected between a first output terminal 111 and second output terminal 112. The first output terminal 111 may refer to the high output voltage. Further, output power lines may be respectively connected to the first output terminal 111 and the second output terminal 112. In the illustrated example, the relay 34 is integrated in the power line connected to the high output voltage (e.g., the first output terminal 111). Further, a load 115 may be electrically connected in parallel to the plurality of battery cells 110.

When one of the power supply lines or one of the relay driver control lines is routed across the interface 20, detaching the connector 22 is directly recognizable through these internal control lines and detachment is directly sensed and can be directly used to open the relay 30. Safety is increased because no additional failure rates (e.g., points of possible failure) need to be considered. Further, the reaction time is fast as there is no HVIL and no additional hardware and software units involved.

Some Reference Numerals

10 relay control system
20 interface
22 connector
24 support panel
30, 34 relay
32 coil
40 relay driver switch
50 controller/microcontroller
60 power supply
V1 first voltage terminal
V2 second voltage terminal
PL1 power supply line
PL2 power supply line
RL1 relay driver control line
RL2 relay driver control line
C1, C2 first/second connector terminal
I1, I2 first/second interface terminal
100 battery system
111 first output terminal
112 second output terminal
115 load

What is claimed is:

1. A relay control system for a battery system, the relay control system comprising:
   an electrical interface configured to detachably receive a connector;
   a power supply electrically connected in parallel to a coil of a relay through power supply lines;
   a relay driver switch interconnected between the power supply and the coil in one of the power supply lines; and
   a controller electrically connected in parallel to the relay driver switch through relay driver control lines to control the relay driver switch,
   wherein one of the relay driver control lines is routed across the electrical interface such that the one from among the power supply lines or the relay driver control lines is electrically conductive across the electrical interface when the connector is connected to the electrical interface and is electrically interrupted across the electrical interface when the connector is detached from the electrical interface,

wherein the relay driver switch is configured to open the
  relay when the relay driver control lines is interrupted
  in response to the connector being detached from the
  electrical interface; and
wherein the relay driver switch is separate from the
  controller and is connected in one of the power supply
  lines between the power supply and the coil.
2. The relay control system according to claim 1,
wherein the relay driver switch is configured to open the
  relay when a control signal of the controller is inter-
  rupted in response to the connector being detached
  from the electrical interface.
3. The relay control system according to claim 2, wherein
the control signal is a logic high level, and
  wherein the relay driver switch is configured to open the
  relay when the logic high level is interrupted in
  response to the connector being detached from the
  electrical interface.
4. The relay control system according to claim 2, wherein
the control signal is an electrical current, and
  wherein the relay driver switch is configured to open the
  relay when the electrical current is interrupted in
  response to the connector being detached from the
  electrical interface.

5. The relay control system according to claim 1, wherein
the power supply is an AC power supply.
6. The relay control system according to claim 1, wherein
the power supply is a DC power supply.
7. The relay control system according to claim 1, wherein
the relay driver switch is a high side driver switch.
8. The relay control system according to claim 1, wherein
the relay driver switch is a low side driver switch.
9. A battery system comprising the relay control system
according to claim 1.
10. The battery system according to claim 9, further
comprising:
  a plurality of battery cells electrically connected between
    a first output terminal and second output terminal; and
  output power lines respectively connected to the first
    output terminal and the second output terminal,
  wherein the relay is integrated in one of the output power
    lines.
11. A vehicle including the battery system according to
claim 9.

* * * * *